Patented Feb. 29, 1944

2,342,957

UNITED STATES PATENT OFFICE 2,342,957

SOLUBILIZING SULPHATHIAZOLE AND SULPHADIAZINE

Edmond E. Moore, Waukegan, Ill., assignor to Abbott Laboratories, a corporation of Illinois No Drawing. Application July 10, 1941,
Serial No. 401,863

5 Claims. (Cl. 260—211)

The present invention relates to new therapeutically useful complexes and particularly to water soluble sulphanilamide-heterocyclic derivatives of high therapeutic value. The basic compounds of the present invention characterized by "C=N" and "CH=CH" groups may be represented by the following formula:

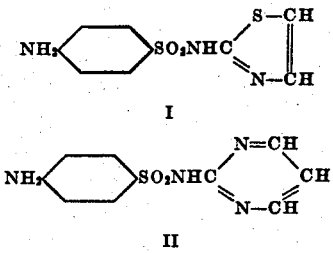

The compound represented by Formula I is known in the art as sulphathiazole and the compound represented by Formula II is known in the art as sulphadiazine or sulphapyrimidine. These compounds have been found to be effective against pneumococcal and streptococcal infections and more recently to be adaptable for use in rapid cures of gonococcal infections.

The principal object of the present invention is to provide soluble complexes of sulphathiazole and sulphadiazine of high therapeutic value.

Other objects of the present invention will be apparent as the description hereinafter proceeds.

In order for compounds of the type described above to be highly effective particularly where rapid cures are desired, it is essential that the therapeutic or drug be administered in a stable form possessing a high blood stream solubility. The compounds sulphathiazole and sulphadiazine are relatively insoluble and it is for this reason that the art has been actively searching for new salts and complexes possessing the desired solubility while retaining at the same time the necessary therapeutic properties.

Heretofore, the art has suggested the use of inorganic alkalies such as caustic soda as a means for overcoming the solubility problem. This suggestion, however, has been found unsatisfactory particularly where the compound is to be used hypodermically as solutions of such salts are characterized by high alkalinity. Various other suggestions have been rejected by the art due to the deleterious effect of the solubilizing agent on the therapeutic properties of the sulpha derivatives.

At the start of the research investigation leading to the present invention various organic amines were tested and found unsatisfactory. Some of the amines were found not to possess the necessary solubilizing characteristics while others such as the mono-, di-, and tri-ethanolamines, butylamine, and the like were found to require the presence of over 100 per cent excess of amine to produce solubility.

After an extensive research investigation which established that as a class the amines including alkanolamines were unfit for solubilizing the basic compounds of the present invention, I discovered that the glucamines and particularly the lower alkyl-glucamines were adaptable for use as solubilizing agents in the present invention. I also discovered that ethylene diamine was adaptable for use as a solubilizing agent for sulphathiazole and sulphadiazine. These discoveries were unexpected in view of the fact that the glucamines and ethylene diamine had been found unsatisfactory for use with sulphanilamide and derivatives thereof such as sulphapyridine.

The following example will serve to illustrate the present invention:

About 1 mole of sulphathiazole powder is dispersed in water and little over 1 mole (e. g. about 15 per cent excess) of methyl glucamine added with stirring. The resulting solution containing the sulphathiazole-methyl glucamine complex possesses a pH value of around 8.8 and is excellently suited for hypodermical administration.

In place of the methyl glucamine used in the above example gulcamine or a lower alkyl glucamine such as ethyl glucamine may be substituted therefor. Sufficient of the amine is added to provide the desired solubility which may be facilitated by warming of the reaction mixture. Also in place of sulphathiazole, sulphadiazine or alkyl derivatives of either compound may be employed as desired.

The compositions of the present invention are stable and possess the desired characteristics at various concentrations for hypodermical administration. They retain the essential therapeutic properties and because of high solubility are readily adaptable for use in cases where high blood concentration is desired. They are also adaptable for use in improved ophthalmic ointments and elixirs.

It will be understood that the present invention is not limited to the above example which is for illustrative purposes only. All modifications of the present invention are intended to be covered by the following claims.

I claim:

1. A therapeutic product consisting of a glucamine complex of a compound selected from the group consisting of sulphathiazole and sulphadiazine, said product being stable and being characterized by high therapeutic value.

2. A therapeutic product consisting of a lower alkyl glucamine complex of a compound selected from the group consisting of sulphathiazole and sulphadiazine, said product being stable and being characterized by high therapeutic value.

3. A therapeutic product, a methyl glucamine complex of a compound selected from the group consisting of sulphathiazole and sulphadiazine, said product being stable and being characterized by high therapeutic value.

4. A composition adaptable for hypodermical administration consisting essentially of an aqueous solution of a sulphathiazole-methyl glucamine complex, said solution being stable and being characterized by high therapeutic value.

5. A composition adaptable for hypodermical administration consisting essentially of an aqueous solution of a sulphadiazine-methyl glucamine complex, said solution being stable and being characterized by high therapeutic value.

EDMOND E. MOORE.